United States Patent [19]
Calvani et al.

[11] Patent Number: 5,257,126
[45] Date of Patent: Oct. 26, 1993

[54] COHERENT OPTICAL FIBER COMMUNICATIONS SYSTEM USING POLARIZATION MODULATION

[75] Inventors: Riccardo Calvani, Pino Torinese; Renato Caponi; Giuseppe Marone, both of Turin, all of Italy

[73] Assignee: CSELT-Centro Studi e Laboratori Telecommunicazioni S.p.A., Turin, Italy

[21] Appl. No.: 883,822

[22] Filed: May 15, 1992

[30] Foreign Application Priority Data

Jul. 4, 1991 [IT] Italy ............... TO91 A000518

[51] Int. Cl.$^5$ ............... H04B 10/04; H04B 10/06
[52] U.S. Cl. ................... 359/181; 359/156; 359/192
[58] Field of Search ............ 359/156, 181, 182, 192, 359/122

[56] References Cited

U.S. PATENT DOCUMENTS

| 3,435,229 | 3/1969 | Buhrer et al. | 359/109 |
| 5,099,351 | 3/1992 | O'Byrne | 359/191 |
| 5,105,295 | 4/1992 | O'Byrne | 359/191 |

FOREIGN PATENT DOCUMENTS

| 0206737 | 8/1989 | Japan | 359/156 |
| 0224427 | 9/1989 | Japan | 359/192 |

OTHER PUBLICATIONS

Calvani et al, "Coherent Transmission Insensitive to Laser Phase Noise by Polarization Modulation and Differential Heterodyne Detection", ECOC 87, 13th Conference on Optical Communication Helsinki Finland, Sep. 13-17, 1987 vol. 3 pp. 9-12.
Kavehrad, "Polarization Insensitive FSK Optical Heterodyne Receiver Using Discriminator Demodulation", Journal Lightwave Technology, vol. 6 #9 Sep. 1988.
E. Dietrich et al., "Heterodyne Transmission of a 560 Mbit/s Optical Signal . . . ", Electronics Letters, vol. 23, No. 8, Apr. 9, 1987.
W. K. Burns et al., Depolarised Source for Fiber-Optic Applications, paper presented at OFC'91, San Diego, Calif., Feb. 18-22, 1991.
A. D. Kersey et al., New Polarisation-Insensitive Detection Technique for Coherent Optical Fibre Heterodyne Communications, Electronics Letters, vol. 23, No. 18, Aug. 27, 1987.

Primary Examiner—Leslie Pascal
Attorney, Agent, or Firm—Herbert Dubno

[57] ABSTRACT

A coherent optical communications system using polarisation modulation, wherein the polarisation modulation of the optical signals is obtained by using two lasers (1, 2) emitting orthogonally polarised radiations at different frequencies, which are combined without losses prior to transmission over the line (FIG. 1).

4 Claims, 1 Drawing Sheet

FIG.1

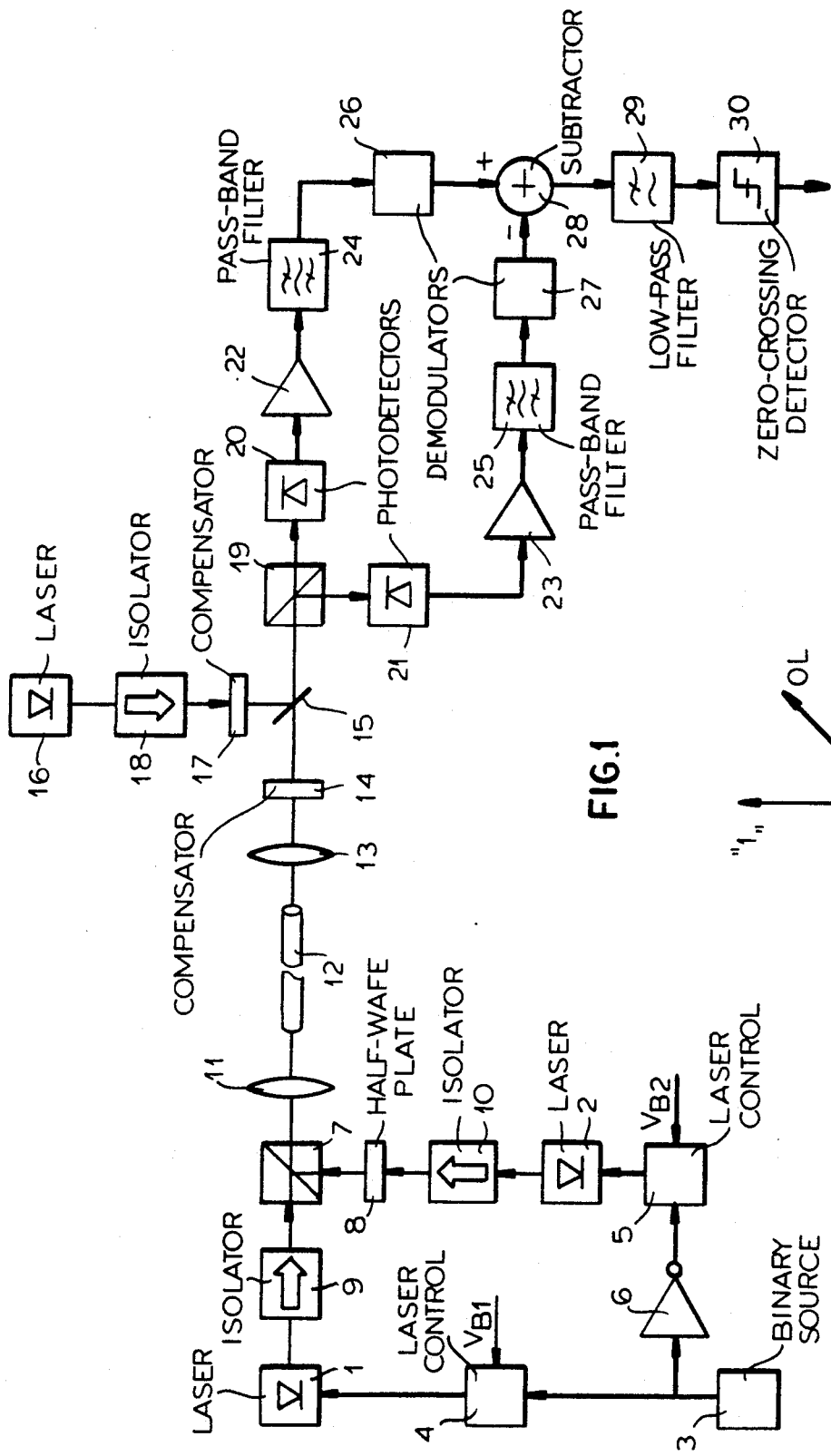
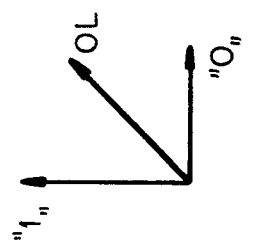
FIG.1
FIG.2

COHERENT OPTICAL FIBER COMMUNICATIONS SYSTEM USING POLARIZATION MODULATION

FIELD OF THE INVENTION

The present invention relates to optical communications systems and more particularly, to a coherent optical communications system using polarization modulation.

BACKGROUND OF THE INVENTION

Polarization modulation of an optical signal is a well known technique of transmitting information in optical communication systems, with either direct or coherent detection. Coherent detection systems are of particular interest since, thanks to conversion of the optical carrier into radiofrequency, selectivity of electronic filters can be used in optical transmissions, thus, permitting a more complete exploitation of the band available on the transmission medium in the case of frequency division multiplex communications. Moreover, in the case of optical fiber transmissions at relatively high wavelengths, such as those lying in the second and third transmission windows (1.3–1.6 $\mu$m), coherent systems eliminate detector noise problems. The use of polarization modulation in such systems affords the advantage of a sensitivity comparable with that of frequency modulation systems with a band occupancy equal to that of amplitude modulation systems.

Typical examples of such systems are described in U.S. Pat. No. 3,435,229 or in the article "Heterodyne transmission of a 560 Mbit/s optical signal by means of polarization shift keying" by E. Dietrich et al., Electronics Letters, Vol. 23, No. 8, Apr. 9, 1987. In these known systems, the signal emitted by the source is supplied to a modulator which, depending on the logic value of the information signal, modulates the state of polarization of the radiation emitted by the source, for instance by allotting orthogonal polarization states to the two logic levels of the information signal. At the receiving side, the line signal is combined with the signal emitted by a local oscillator, polarised so as to present components having the same polarization as the line signal; the signal resulting from the combination is polarization analyzed, the different components are separately converted into electrical signals and the signals received are suitably demodulated.

In such systems the polarization modulation of the optical carrier requires the use of modulators external to the source. At the transmission rates typical of coherent optical communications systems (from some hundred Mbit/s to some Gbit/s), the modulators commonly used are integrated-optics guide elements, which are generally expensive and moreover give rise to high losses, due to both the attenuation of the guide itself and the coupling between the guide and the possible fiber pigtail allowing connection to an optical fiber.

OBJECT OF THE INVENTION

It is an object of the invention to provide a coherent communications system wherein the polarization modulation does not require the use of devices external to the source.

SUMMARY OF THE INVENTION

A method of transmitting optical signals polarization modulated by a binary digital information signal, according to the invention, is characterized in that two sources of linearly polarized radiation are frequency modulated in a complementary way, by the information signal, so that the first source emits radiation at a first and a second frequency in correspondence with the first and the second logic level of the information signal and the second source emits signals at a third and a fourth frequency, substantially equal to the first and the second frequencies, is correspondence with the second and first logic level of the information signal.

The states of polarization of the radiations emitted by the two sources are rendered orthogonal in correspondence with each bit of the information signal. The two orthogonally polarized radiations are combined in order to send on a transmission line, or each bit, a signal comprising two orthogonally-polarized components at different frequencies.

A coherent heterodyne detection of the modulated signals is carried out at a receiving side, by combining the signals with the signal emitted by a local oscillator and having such a polarization as to present two components with the same polarization as the signals emitted by the sources. The two orthogonal polarization components in the signal resulting from the combination between the line signal and the local signal are separated, converted into electrical signals and separately demodulated.

Prior to demodulation the electrical signals resulting from the conversion of the two components, which signals are frequency modulated in a manner corresponding to the signals emitted by a respective source, are filtered to eliminate one of the two frequencies, and the demodulation is carried out, for each bit of the information signal, on signals deriving from the conversion of either polarization component.

A coherent optical fiber heterodyne transmission system using polarization modulation can comprise a transmitter with means for sending on a line optical signals which can present two orthogonal states of polarization in correspondence with the two logic levels of a binary digital information signal.

The means for sending the signal on the line can comprise a light source of light radiations, which emits radiation linearly polarized in a first plane and is driven by the information signal so as to emit radiation at a first or a second frequency according to whether said signal presents the first or the second of the two logic levels, a second source of light radiation, which emits radiations linearly polarized in a second plane orthogonal to the first plane and is biased by the information signal in a complementary manner to the first source, so as to emit radiation at a third or a fourth frequency, substantially the same as the first and second frequencies, respectively, according to whether the signal presents the second or the first of the two logic levels, and means for combining the radiations emitted by the two sources into a signal radiation which is sent onto an optical fiber transmission line and comprises, for each of the two logic levels of the information signal, two orthogonally-polarized components at different frequencies.

A local oscillator can generate a signal which is combined with the line signal and presents a polarization state such as to give origin to two components orthogonally polarized in a way corresponding to the two states of polarization of the line signal. A polarization separating device divides the signal resulting from the combination into the two orthogonally-polarized components which are separately converted into electrical signals in respective conversion devices which are followed by respective circuits demodulating the electrical signal.

The polarization separating device can send toward the two conversion devices signal frequency modulated in a complementary way, which reproduce the frequency modulation of the signals emitted by the respective sources, and the conversion devices are followed by respective filters which pass to the demodulation circuits signals having only one of the two frequencies present in the electrical signal.

The invention eliminates the need for external modulators thanks to the use of two sources emitting orthogonally-polarized radiations at different frequencies. The absence of an external modulator obviates to the attenuation problems. A semiconductor laser is also a device which is much cheaper than an integrated-optics modulator, so that cost problems are eliminated or at least reduced.

It is known to use two radiations with the above characteristics in order to obtain insensitivity to polarization fluctuations in detection systems or in optical fiber communications systems. The paper "Depolarized source for fiber-optic applications" presented by W. K. Burns et al. at the OFC'91 Conference (San Diego, Calif., Feb. 18-22, 1991) and published at page 205 of the conference proceedings, describes a system in which the two radiations, generated by respective lasers, are combined to obtain in the line a depolarised radiation. The system described in that paper does not use polarization for information purposes, as does the present invention. Besides each source emits always at a single frequency, whereas one of the essential features of the invention is the frequency modulation of both lasers. In the absence of such a frequency modulation, implementation of a polarization modulation without external modulators is impossible, since this would require an on-off amplitude modulation of the lasers, which cannot be effected without rendering the lasers unsteady or damaging the lasers.

The article "New polarization insensitive detection technique for coherent optical fiber heterodyne communications" by A. D. Kersey et al., Electronics Letters, Vol. 23, No. 18, Aug. 27, 1987, discloses the use of two orthogonally-polarised radiations at different frequencies to obtain the output signal of the local oscillator in a polarization diversity heterodyne receiver for a coherent communications system. The two radiations are obtained from a single source, by means of a polarising beam splitter generating the two orthogonal polarization and of an acousto-optic modulator placed downstream the beam splitter, on the path of only one of the two orthogonally-polarised radiations. Also in this case, the two radiations always have a constant frequency and hence the considerations already made for the paper presented at OFC'91 still hold. Besides, even assuming that both signals outgoing from the acousto-optic modulator are used, and not only the frequency shifted signal, the invention cannot be obtained, since only one of the two radiations would be frequency-modulated.

BRIEF DESCRIPTION OF THE DRAWING

The above and other objects, features and advantages of the present invention will become more readily apparent from the following description, reference being made to the accompanying drawing in which:

FIG. 1 is a schematic representation of the coherent communications system, and

FIG. 2 is a schematic representation of the states of polarization.

SPECIFIC DESCRIPTION

In the drawing, thin lines represent the optical signal paths and thick lines the electrical signal paths.

In FIG. 1, two semiconductor lasers 1, 2, which are as far as possible similar to each other, are connected to a source 3 of the binary data flow so as to be frequency-modulated by said flow with complementary sequences of information bits. E.g., the information signal is supplied as it is emitted to control devices 4 of laser 1, where it is superimposed to the d.c. bias voltage VB1 and causes the laser to oscillate at a frequency $f_0$ in correspondence with logic value 0 of the binary signal and at a frequency $f_1$ in correspondence with logic value 1. The information signal is on the contrary supplied to control devices 5 of laser 2 through an inverter 6 and is superimposed to d.c. voltage VB2 so as to cause laser 2 to oscillate at frequencies $f_0$ and $f_1$, close or nominally equal to frequencies $f_0$, $f_1$, in correspondence with logic values 1 and 0, respectively. It is worth noting that two individual sources, even though nominally equal, always present a certain frequency difference (e.g. due to the random fluctuations which are always present), which is practically impossible to compensate; yet that difference does not affect the invention, which exploits the presence of two different frequency values for each laser, and hence hereinafter both lasers will be assumed to operate at frequencies $f_0$ and $f_1$.

The radiation emitted by laser 1, which is a linearly polarised radiation, is sent to a polarising beam splitter 7 and is received e.g. on the transmitting face; splitter 7 receives also, on the reflecting face, the radiation emitted by laser 2, which has passed through a half-wave plate 8 and hence is polarised in an orthogonal plane to that of the radiation emitted by laser 1. Isolators 9, 10 on the paths of the radiations emitted by the lasers prevent the reflected rays from re-entering lasers 1, 2. Splitter 7 combines the two beams and sends the resulting radiation, through a suitable optical system schematically represented by lens 11, into a conventional monomode fiber 12, forming the system transmission line. The beam outgoing from the fiber is collimated by an optical system schematically represented by lens 13, and is sent to a compensator 14, e.g. a Soleil-Babinet compensator, which recovers the linear polarization states of the beam outgoing from the fiber, generally rendered elliptical by the travel along the fiber.

The compensated beam is combined, in a coupler 15, with the beam emitted by a local oscillator, consisting of a semiconductor laser having a line width as far as possible equal to that of lasers 1, 2, and operating at frequency $f_L$ different from $f_0$, $f_1$. The beam emitted by laser 16 is sent to the coupler through a compensator 17, by which the beam is polarised e.g. at 45° with respect to the reference axes, so that it presents a component polarised in the plane of each of the components of the beam arriving from the fiber. Isolator 18, having the same functions as isolators 9, 10, is placed between oscillator 16 and compensator 17. The beam resulting from the combination is analyzed in polarization by a polarization separator 19, e.g. a Glan-Taylor prism, which for instance transmits the horizontally polarised component to a first photodetector 20 and reflects the vertically polarise component towards a second photodetector 21. The orientations of the polarization of the local oscillator and of the information bits are schematically represented in FIG. 2.

The electrical signals outgoing from photodetectors 20, 21, which comprise beats at frequencies $F_0 = f_L - f_0$ and $F_1 = f_L - f_1$, are amplified in respective amplifiers 22, 23, filtered in passband filters 24, 25 having the same passband, e.g. tuned on frequency $F_0$, and demodulated in square law demodulators 26, 27. The signal outgoing from demodulator 27 is subtracted in a subtractor 28 from the signal outgoing from demodulator 26, so as to double the dynamics, and the signal resulting from the subtraction is supplied to a low pass filter 29 delimiting the signal base band. A threshold circuit 30, e.g. a zero crossing detector, supplies the recovered data signal.

The device operation is apparent from the above description. Owing the way in which lasers 1, 2 are biased, in correspondence with each bit of the data signal signal comprises a horizontally polarised component at frequency $f_0$ and a vertically polarised component at frequency $f_1$, while for bits 1 it comprises a horizontally polarised component at frequency $f_1$ and a vertically polarised one at frequency $f_0$. Hence the line signal is simultaneously modulated in polarization and frequency. At the receiving side, as in conventional coherent systems with polarization modulation, the line signal is combined with the signal emitted by local oscillator 16 and the two orthogonal polarizations are sent to detectors 20, 21. Each one of the two states of polarizations is still associated with the frequency modulation, so that both detectors 20, 21 generates the beats at frequencies $F_0 = f_L - f_0$ and $F_1 = f_L - f_1$. The beat at frequency $F_1$ is eliminated in bandpass filters 24, 25, so that the subsequent circuits in the receiver process signals containing only the information relevant to the state of polarization. More particularly, demodulators 26, 27 will supply respective demodulated signals at frequency $F_0$ indicating the presence of bit 0 and bit 1, respectively. Subtractor 28 receives the demodulated signals at the positive or negative input, respectively, and therefore supplies signals with different values depending on the branch which has conveyed the signals at frequency $F_0$, and hence on the logic value of the transmitted bit. Filter 29 and threshold circuit 30 allow their recovery of the digital sequence.

We claim:

1. A method of transmitting optical signals polarization modulated by a binary information signal, said method comprising the steps of:
   (a) complementarily frequency modulating two sources of linearly polarized radiation with a binary information signal having first and second logic levels so that a first of said sources emits radiations at a first and a second frequency in correspondence with said first and second logic levels of said information signal and a second of said sources emits radiations at a third and a fourth frequency in correspondence with said second and first logic levels of said information signal, respectively, said third and fourth frequencies being substantially the same as said first and second frequencies;
   (b) orthogonalizing states of polarization of the radiations emitted by said first and second of said sources so that the states of polarization are rendered orthogonal in correspondence with each bit of the information signal; and
   (c) combining the two orthogonally polarized radiations to send out on a transmission line for each of said bits a signal comprising two orthogonally polarized components at different frequencies.

2. The method defined in claim 1, wherein a coherent heterodyne detection of the modulated signals is carried out at a receiving side by combining such signals with the signal emitted by a local oscillator and having such a polarization as to present two components with the same polarization as the signals emitted by the sources, and the two orthogonal polarization components in the signal resulting from the combination between a line signal and a local signal are separated, converted into electrical signals and separately demodulated, said method further comprising the steps of:
   prior to demodulation, filtering electrical signals resulting from conversion of the two components, which signals are frequency modulated in a manner corresponding to the signals emitted by a respective one of said sources, to eliminate one of the two frequencies; and
   carrying out the demodulation for each bit of the information signal, on signals deriving from the conversion of either polarization component.

3. A coherent optical fiber heterodyne transmission system using polarization modulation, comprising:
   a transmitter with means for sending on a line optical signals which can present two orthogonal states of polarization in correspondence with two logic levels of a binary digital information signal, the means for sending the signals on the line can comprising:
   a light source of light radiations, which emits radiation linearly polarized in a first plane and is driven by the information signal so as to emit radiation at a first or a second frequency according to whether said signal presents the first or the second of the two logic levels;
   a second source of light radiations, which emits radiations linearly polarized in a second plane orthogonal to the first plane and is biased by the information signal in a complementary manner to the first source, so as to emit radiation at a third or a fourth frequency, substantially the same as the first and second frequencies, respectively, according to whether the signal presents the second or the first of the two logic levels; and
   means for combining the radiations emitted by the two sources into a single radiation which is sent onto an optical fiber transmission line and comprises, for each of the two logic levels of the information signal, two orthogonally-polarized components at different frequencies.

4. A system as defined in claim 3, comprising a heterodyne receiver wherein a local oscillator generates a signal which is combined with a line signal and presents a polarization state such as to produce two components orthogonally polarized in a way corresponding to two states of polarization of a line signal, and a polarization separating device divides the signal resulting from the combination into the two orthogonally-polarized components which are separately converted into electrical signals in respective conversion devices which are followed by respective circuits demodulating the electrical signal, said polarization separating device sending toward the two conversion devices signals frequency modulated in a complementary way, which reproduce the frequency modulation of the signals emitted by the respective sources, and said conversion devices being followed by respective filters which pass to the demodulation circuits signals having only one of the two frequencies present in the electrical signal.

* * * * *